United States Patent [19]
Winterfeldt

[11] 3,892,754
[45] July 1, 1975

[54] 5,6-BENZO-γ-PYRIDONE DERIVATIVES

[75] Inventor: Ekkehard Winterfeldt, Grossburgwedel, Germany

[73] Assignee: Badische Anilin- & Soda-Fabrik Aktiengesellschaft, Ludwigshafen (Rhine), Germany

[22] Filed: Dec. 10, 1971

[21] Appl. No.: 206,922

[30] Foreign Application Priority Data
Nov. 13, 1971 Germany............................ 2156501
Dec. 12, 1970 Germany............................ 2061359

[52] U.S. Cl...... 260/287 R; 260/289 A; 260/295 C; 424/258
[51] Int. Cl............................................. C07d 39/00
[58] Field of Search....... 260/287 R, 289 A, 283 SY

[56] References Cited
UNITED STATES PATENTS
3,234,142  2/1966  Wolfrum........................ 260/287 R
3,634,346  1/1972  McKeon........................ 260/289 R

OTHER PUBLICATIONS
Winterfeldt et al., Chem. Commun., Vol. 1971, p. 374–375.
Chem. and Eng. News, July 11, 1966, p. 19.
Chem. and Eng. News, December 12, 1966, p. 64–68.

*Primary Examiner*—Donald G. Daus
*Attorney, Agent, or Firm*—Johnston, Keil, Thompson & Shurtleff

[57] ABSTRACT

A method for producing 5,6-γ-pyridone derivatives by oxidation of indole derivatives, and to 5,6-γ-pyridine derivatives. In the process, compounds of the Formula (II)

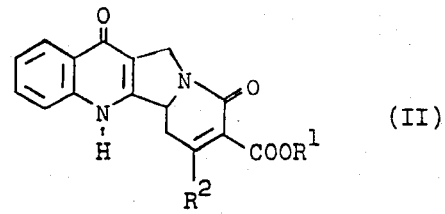

are prepared by treating compounds of the Formula (I)

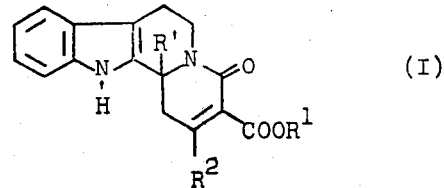

with oxygen in the presence of a proton acceptor. The compounds are useful in producing quinoline derivatives which have important pharmacological properties.

1 Claim, No Drawings

5,6-BENZO-γ-PYRIDONE DERIVATIVES

The invention relates to the production of 5,6-γ-pyridone derivatives by oxidation of indole derivatives, and to 5,6-γ-pyridine derivatives.

5,6-benzo-γ-pyridone derivatives can be converted by reduction into quinoline derivatives of which important representatives occur in nature with pharmacological properties, for example as substances inhibiting tumors. An important member of this series is camptothecine of the formula:

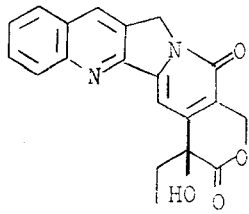

There has therefore been a need for a method of reaction to be found which permits the oxidation of indole derivatives with low expenditure and moreover permits the production of derivatives which conform to the structure of the natural substances or closely approximate thereto.

I have found that from compounds of the formula (I):

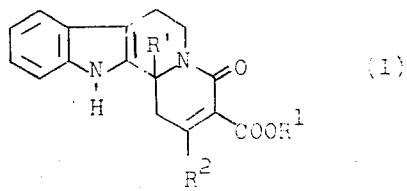

in which
R' is H or $CH_3$;
$R^1$ is a radical conventional for esterification, particularly lower alkyl, or higher alkyl, benzyl or phenyl;
$R^2$ is OH (Ia), —HC=$(COOR^3)_2$ (Ib), —O— alkyl or —$CH_2$—$COOR^3$, and
$R^3$ is a radical like $R^1$, again particularly lower alkyl, form compounds of the formula (II):

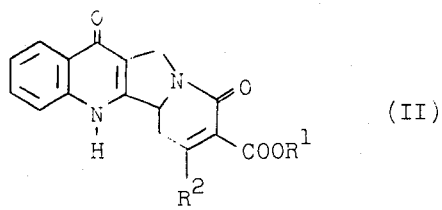

when said compounds of formula (I) are treated with oxygen in the presence of a proton acceptor.

The lower alkyl $R^1$ is preferably methyl, ethyl or propyl; the lower alkyl $R^3$ is preferably t-butyl. $R^1$ and $R^3$ may be identical or different.

Examples of proton acceptors are alkali and alkaline earth metal alkoxides, alkali and alkaline earth metal hydrides, alkali and alkaline earth metal acetylides, alkali and alkaline earth metal amides, Grignard compounds, sterically hindered tertiary amines, strongly basic ion exchangers, and quaternary ammonium hydroxides. Mixtures of two or more of the said proton acceptors may also be used.

For practical reasons, the alkali metals on which the proton acceptors are based are usually lithium, sodium and potassium, and the alkaline earth metals are magnesium and calcium.

In general it is convenient to use as alcohols those having up to 6 carbon atoms, e.g. methyl, ethyl, propyl, isopropyl or t-butyl alcohol, secondary or tertiary alkoxides of the said metals, and also higher alcohols or glycols.

Examples of hydrides are lithium, sodium and calcium hydride. Suitable acetylides are for example sodium and calcium acetylides. Examples of amides are lithium amide, sodium amide, lithium piperidide, and lithium di-isopropylamide. Of the Grignard compounds those which are sterically hindered are preferred, e.g. 0,0-dimethylphenyl-Mg-halide. Sterically hindered tertiary amines, including for example ethyl di-isopropylamine and diazabicyclooctane, are described in German Pat. No. 1,132,135.

Strongly basic ion exchangers are for example those having quaternary trialkylammonium groups and being commercially available under the names LEWATIT M500, M600, MP500, and MP5080, AMBERLIT IRA 400 and IRA 401, and DOWEX 1 and 2.

An example of a quaternary ammonium hydroxide which is suitable for the purposes of the process of this invention is trimethylbenzyl ammonium hydroxide. In many cases it may be advantageous not to add the proton acceptor as such to the reaction medium, but (like sodium hydride) as a suspension in an inert liquid, e.g. spindle oil or naphtha.

The following Examples serve to illustrate the invention which will be readily understood by those skilled in the art after reading the present specification.

The Examples may be modified in many ways without departing from the spirit of this invention.

Starting compound with $R^2$ denoting OH (Ia) may be obtained by reacting the ester having the formula (III):

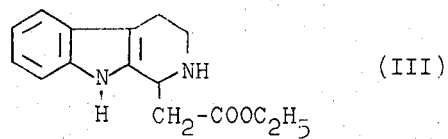

(G.B. Kline, J. Am. Chem. Soc. 81, 2251 (1959)) with a monoalkyl malonate to form an ester of the formula (IV):

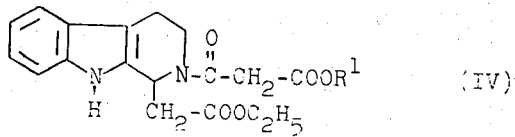

and converting this by ring closure into the compound (Ia).

The compound (Ia) can be converted with diazomethane into the methyl ether of formula (V):

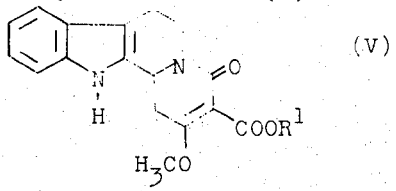

and the starting compound with $R^2$ denoting —HC=(COOR³)₂ (Ib) can be prepared therefrom for ample with di-t-butyl malonate in the presence of sodium hydride.

The compounds obtainable according to this invention are important precursors for camptothecine. They may be converted with thionyl chloride into the 4-chloroquinoline derivatives (VIa) and (VIb):

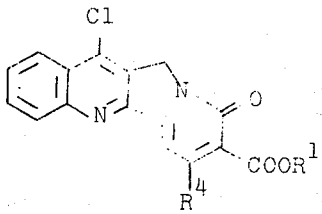

(VIa): $R^4$ denotes Cl
(VIb): $R^4$ denotes —HC=(COOR³)₂.

The chlorine may be replaced by hydrogen by a known method reductively by means of a partially poisoned catalyst.

The following description is concerned with the production of compounds (II) by the process of this invention:

Oxygen, air or mixtures of oxygen and other gases may be used as the oxidizing agent for the process of the invention. The oxidation only proceeds in the desired direction however when a proton acceptor is present in the reaction mixture. Potassium t-butylate and sodium hydride are particularly preferred. The oxidation combined with a rearrangement of the ring is carried out in a liquid medium. Suitable liquids for this purpose include polar organic solvents or liquids which do not take part in or interfere with the reaction such as dimethylformamide, dimethyl sulfoxide or hexamethylphosphoric acid triamide or also for example alcohols which are liquid at the reaction temperature. Mixtures of such liquids are also suitable. It is preferred to use dimethylformamide.

The reaction temperature may be room temperature, for example from 15° to 30°C. If longer reaction periods are tolerable, a temperature of about 0°C is suitable. Shorter reaction periods may be achieved by gentle heating, for example to about 50°C.

The reaction may be carried out for example by dissolving the indole derivative in a solvent of the said type, adding an equimolar amount or twice the equimolar amount of a proton acceptor, flushing oxygen or air through and leaving the mixture for from 1 hour to 3 hours at about 18° to 25°C. The whole is then poured into about 4 times the amount of the reaction mixture of icewater which contains about 2% of an acid, preferably acetic acid, for decomposition of the proton acceptor, adjusted to a'pH of from 7 to 8, preferably about 7.5, with an alkaline solution such as saturated sodium carbonate solution and the pyridone derivative is extracted with an extractant by a known method, for example with methylene chloride. The course of the oxidation up to the end point may if desired be followed by infrared spectroscopy of NMR measurements.

The process of the invention gives new 5,6-benzo-γ-pyridines whose carbonyl groups can be reduced or can be chlorinated by reaction for example with phosphorus oxychloride. The chlorine atom may then be replaced in turn by other atoms or atomic groups. Ester groups may be hydrolyzed to the free carboxylic acid groups. All the compounds thus obtained are valuable intermediates for the pharmaceutical industry, particularly for the manufacture of tumorinhibiting agents.

When the pyridone oxygen is acylated, quinoline derivatives are formed which also have significance as antimalarial agents.

Production of (Ia):

6.6 g of the ethyl ester (III) is dissolved in 50 ccm of absolute methylene chloride, 3.5 g of monoethyl malonate is added and then a solution of 5.5 g of dicyclohexylcarbodiimide in 20 ccm of methylene chloride is dripped in rapidly. The urea precipitated is filtered off 1 hour later. The filtrate is concentrated, poured into water and extracted with ether. The ether solution is washed with dilute hydrochloric acid (1N), with dilute bicarbonate solution and finally with saturated potassium chloride solution. After evaporation in vacuo, 8.4 g (85%) of oil (IV) (with $R^1$ denoting ethyl) is obtained.

Infrared: NH 3345; C=O 1735, 1635.
NMR: aromatic proton τ 2.5 – 3.0(4), tertiary proton 4.0(1)
—CO—CH₂—CO 5.42(2)
O-CH₂-CH₃ 6.43(4);
O—CH₂—CH₃ 8.74(6)
$C_{20}H_{24}N_2O_5$ 372.2
mass spectroscopy 372.2.

1 g of potassium t-butylate is dissolved in 24 ccm of t-butanol and at room temperature a solution of 3.1 g of (IV) in 24 ccm of t-butanol is slowly added. After an hour at room temperature the solution is poured into water and acidified with 2N hydrochloric acid, extracted with ether, washed with saturated potassium chloride solution and evaporated to dryness. The residue is recrystallized from methanol and 2.1 g (81%) of (Ia) (with $R^1$ denoting ethyl) is obtained which has a melting point of 201°C with decomposition.

IR: NH 3450, OH 3260, CO 1610.
NMR: aromatic protons 2.5 – 3.1 (4)
O-CH₂-CH₃ 5.76(2)
O-CH₂-CH₃ 8.75(3)
$C_{18}H_{18}N_2O_4$ 326
mass spectroscopy 326
calculated: C 66.21 H 5.56 N 8.59. found: C 66.32 H 5.68 N 8.65.

Production of (Ib):

2 g of the enol (Ia) is dissolved in 200 ccm of methylene chloride and an ethereal solution of diazomethane is slowly added at room temperature until a Fe(III) reaction can no longer be observed. After allowing to stand for 10 minutes at room temperature, the organic phase is shaken first with dilute acetic acid, then with saturated bicarbonate solution and finally with saturated sodium chloride solution. The whole is then evaporated and the residue is taken up in ether. After standing in a refrigerator 350 mg of the isomeric crystalline enol ether is deposited. The mother liquor which is homogeneous according to thin-layer chromatography after evaporation contains about 1.5 g of crude (V) (71%). For characterization some of the mother liquor is chromatographed on silica gel and a crystalline produce (V) (with $R^1$ denoting ethyl) is obtained in this way which has a melting point of 118°C.

IR: 3460, 1715, 1635
NMR: NH τ 0.55 (1) s, aromatic protons 2.45 – 3.05 (4) m,
O-$CH_2$-$CH_3$ 5.8(2) a,
O$CH_2$-$CH_3$ 8.76 (3) tr.,
O$CH_3$ 6.17 (3) s.
$C_{19}H_{20}N_2O_4$ 340
mass spectroscopy 340.

500 mg of the enol ether (V) is dissolved in 10 ccm of absolute dioxane and united under nitrogen with a solution of 300 mg of t-butyl malonate and 80 mg of sodium hydride in 20 ccm of absolute dioxane. After 1 hour under reflux, decompositon is effected with dilute acetic acid and extraction with methylene chloride. The organic phase is shaken with saturated bicarbonate solution and then with saturated sodium chloride solution and dried over sodium sulfate. The solvent is then evaporated off in vacuo. The residue which remains is chromatographed on silica gel and from the fraction there is obtained with ether/petroleum ether (1:1) 230 mg (30%) of the triester (Ib) (with $R^1$ denoting ethyl and $R^3$ denoting T-butyl). It has a melting point of 182°C.

IR: 3400, 1730, 1715, 1660, 1635.
NMR: NH 1.9 (1), aromatic protons 2.4–3.0 (4),
O$CH_2$—$CH_3$ 5.5(2) q,
O$CH_2$—$CH_3$ 8.6 (3) tr., O-C$(CH_3)_3$
8.45 (9) s, 8.55 (9) s
$C_{29}H_{36}N_2O_7$ 524.6
mass spectroscopy 524.6.
calculated: C 66.39 H 6.92 N 5.34. found: C 66.32 H 7.16 N 5.43.

Production of chlorine derivatives (VIa) and (VIb):

200 mg of the quinoline (IIa) is dissolved in 5 ccm of dimethylformamide (absolute) and while cooling with ice 1 ccm of thionyl chloride is slowly added. After thirty minutes at room temperature, the whole is slowly poured into ice-cold saturated bicarbonate solution and extracted with methylene chloride. The methylene chloride phase is washed with saturated sodium chloride solution and evaporated in vacuo. The residue is recrystallized from methylene chloride/acetone and 190 mg (85%) of the chlorine derivative (VIa) (with $R^1$ denoting methyl) is obtained which has a melting point of 232°C.

ultraviolet: 248 (shoulder) 254, 365
IR: 1535, 1605, 1615, 1645, 1655 (aromatic) 1725 C=O
NMR aromatic protons 1.8 – 2.2 τ (4) 2.83 (1),
$CH_2$ 4.80 (2), O$CH_3$ 6.01 (3),
$C_{17}H_{10}N_2O_3Cl_2$
361.1 mass spectroscopy 361.2

In a similar way the chlorine derivative (VIb) (with $R^1$ denoting ethyl and $R^3$ denoting t-butyl) is obtained from (IIb): melting point 191°C.

IR: 1500, 1535, 1625, 1660, 1730
ultraviolet: 249 (shoulder), 255, 373
$C_{29}H_{31}N_2O_7Cl$
calculated: 554, 1819
found (mass spectroscopy): 554, 1812.

The following Examples illustrate the invention:

EXAMPLE 1

Production of compound (IIa):

300 mg of the compound (Ia) with $R^1$ denoting ethyl is dissolved in 25 ccm of dimethylformamide and 400 mg of potassium t-butylate is added to the solution. After aeration with oxygen, the whole is allowed to stand for 10 hours at room temperature, then poured onto 30 ccm of ice-water and clearly acidified with concentrated hydrochloric acid. The precipitate which forms slowly is suction filtered after some time, washed with acetone and finally with ether and in this way an amorphous product is obtained which is allowed to stand overnight in a methanol solution of hydrochlorid acid. The solvent is then evaporated and the product (IIa) with $R^1$ denoting methyl is recrystallized from methanol. the yield is 50%. Melting point 230°C with decomposition.

UV: 325,314 (qualitative)
IR: C=O 1620, aromatic 1580
NMR: aromatic protons 1.9
(1) 2.3 – 2.8
(3), $CH_2$ 5.6
(2) O$CH_3$ 6.27(3),
$C_{17}H_{14}N_2O_5$ 326.3
calculated: C 62.57 H 4.33 N 8.58. found: C 62.14 H 4.54 N 8.68

EXAMPLE 2

Production of compound (IIb):

It is obtained from (Ib) by an analogous method to that described in Example 1.

EXAMPLE 3

500 mg of the indole derivative of formula A above is dissolved in 100 ccm dimethylformamide, 400 mg of a 50% suspension of sodium hydride in spindle oil is added, and oxygen is passed through the solution at room temperature for 15 hours. The proton acceptor is decomposed with dilute acetic acid and the pyridone derivative extracted with methylene chloride.

The methylene chloride phase is washed with saturated sodium bicarbonate solution and then evaporated. Recrystallization from an ether/acetone mixture gives 380 mg (72%) of the quinolone of formula B.

EXAMPLE 4

By oxidizing the indole of formula C in the manner described in Example 3 the quinolone of formula D is obtained in a 76% yield.

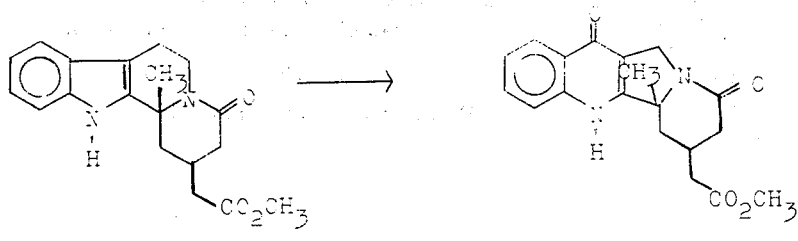

C

EXAMPLE 5

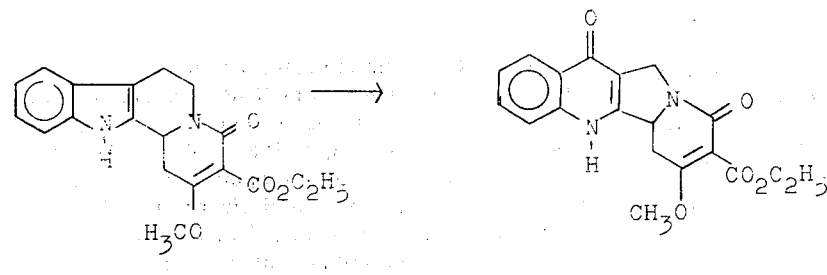

E 500 mg of the indole derivative of formula E above is dissolved in 100 ccm dimethylformamide, 200 mg sodamide is added, and the solution is allowed to stand at room temperature under oxygen for 15 hours. Dilute acetic acid is carefully added to decompose the proton acceptor and the product is extracted with methylene chloride. Evaporation gives 280 mg (53%) quinolone of formula F above.

EXAMPLE 6

C → D 500 mg of the indole compound of formula C is dissolved in 100 ccm dioxane and then a Griguard compound of 200 mg o,o-dimethylbromobenzene and 30 mg magnesium in 20 ccm dioxane is added. The mixture is allowed to stand at room temperature under oxygen for 15 hours. Dilute acetic acid is added to effect decomposition and methylene chloride is used as extractant. By evaporation of the solvent 320 mg (60%) of the quinolone derivative of formula D is obtained.

EXAMPLE 7

500 mg of the indole derivative of formula G above, dissolved in 100 ccm dimethylformamide is heated for 12 hours at 50°C in the presence of 500 mg LEWATIT MP 5080 (a strongly basic ion exchanger) while passing oxygen through. The ion exchanger is filtered off and the filtrate evaporated to dryness under reduced pressure. The residue is recrystallized from methanol and 240 mg (46%) of the quinolone of formula H is obtained.

What is claimed is:

1. A process for the production of a 5,6-benzo-γ-pyridone having the formula:

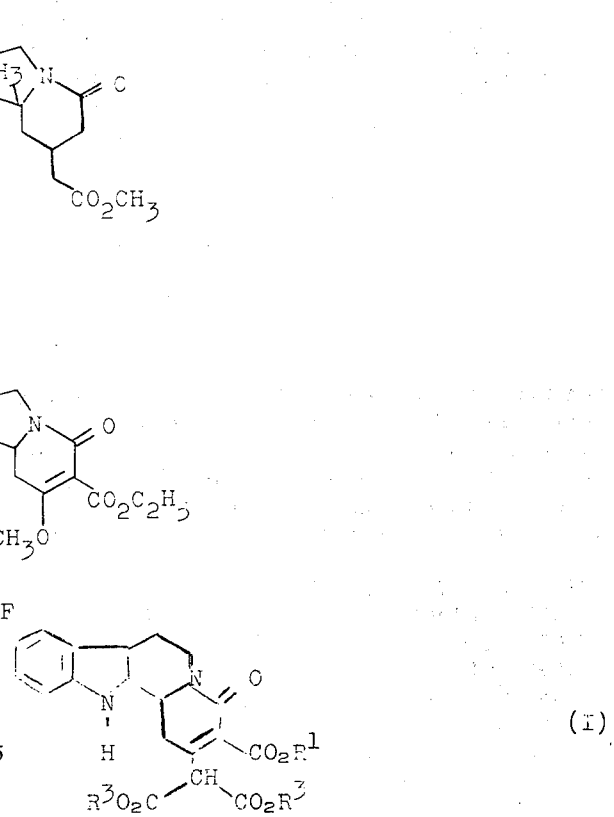

in which $R^1$ denotes alkyl of from 1 to 3 carbons, and $R^3$ denotes t-butyl which comprises subjecting an indole of the formula:

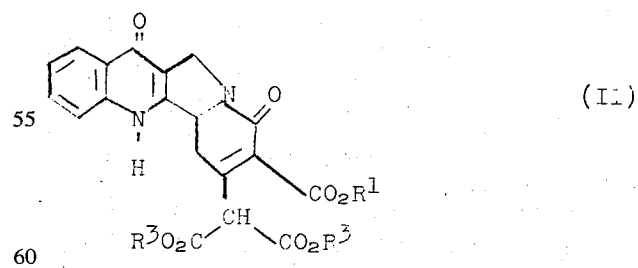

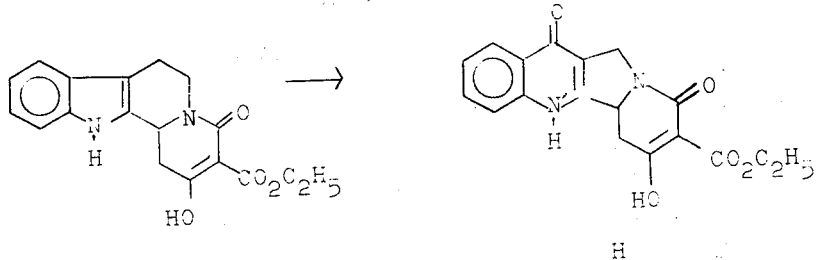

G

H in which $R^1$, and $R^3$ have the meanings expressed above, to a combined rearrangement and oxidation by means of oxygen and a proton acceptor which is an alkoxide with 1 to 6 carbon atoms, a hydride or an amide of lithium, sodium, potassium, magnesium, or calcium in a liquid medium at a temperature of from 0° to 50°C to form said compound II.

* * * * *